C. A. FLEMING.
RADIUS JACK.
APPLICATION FILED APR. 8, 1912.
1,075,639.
Patented Oct. 14, 1913.
2 SHEETS—SHEET 1.
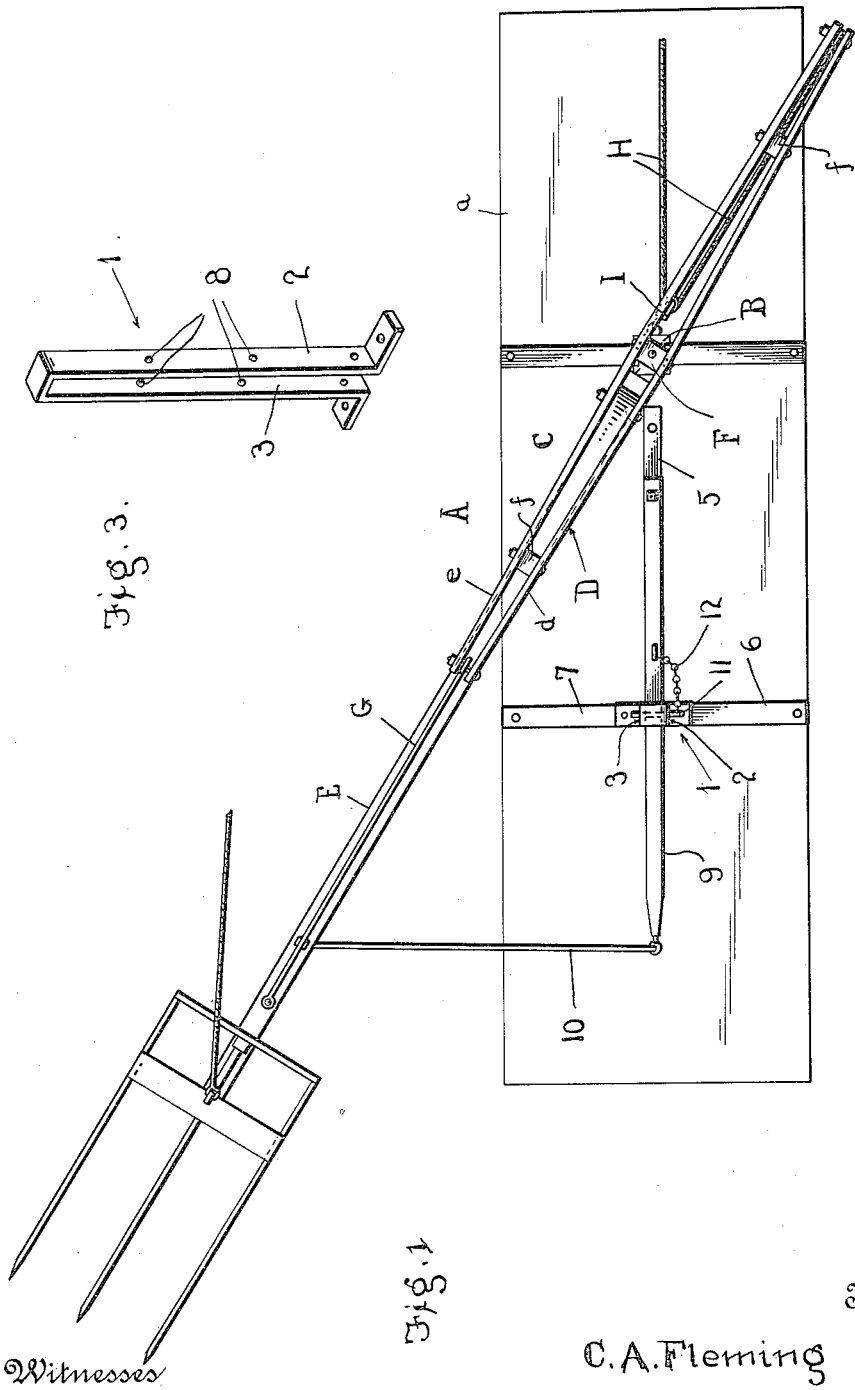
Witnesses
L. B. James
S. M. McColl
Inventor
C. A. Fleming
by H. B. Willson & Co.
Attorneys

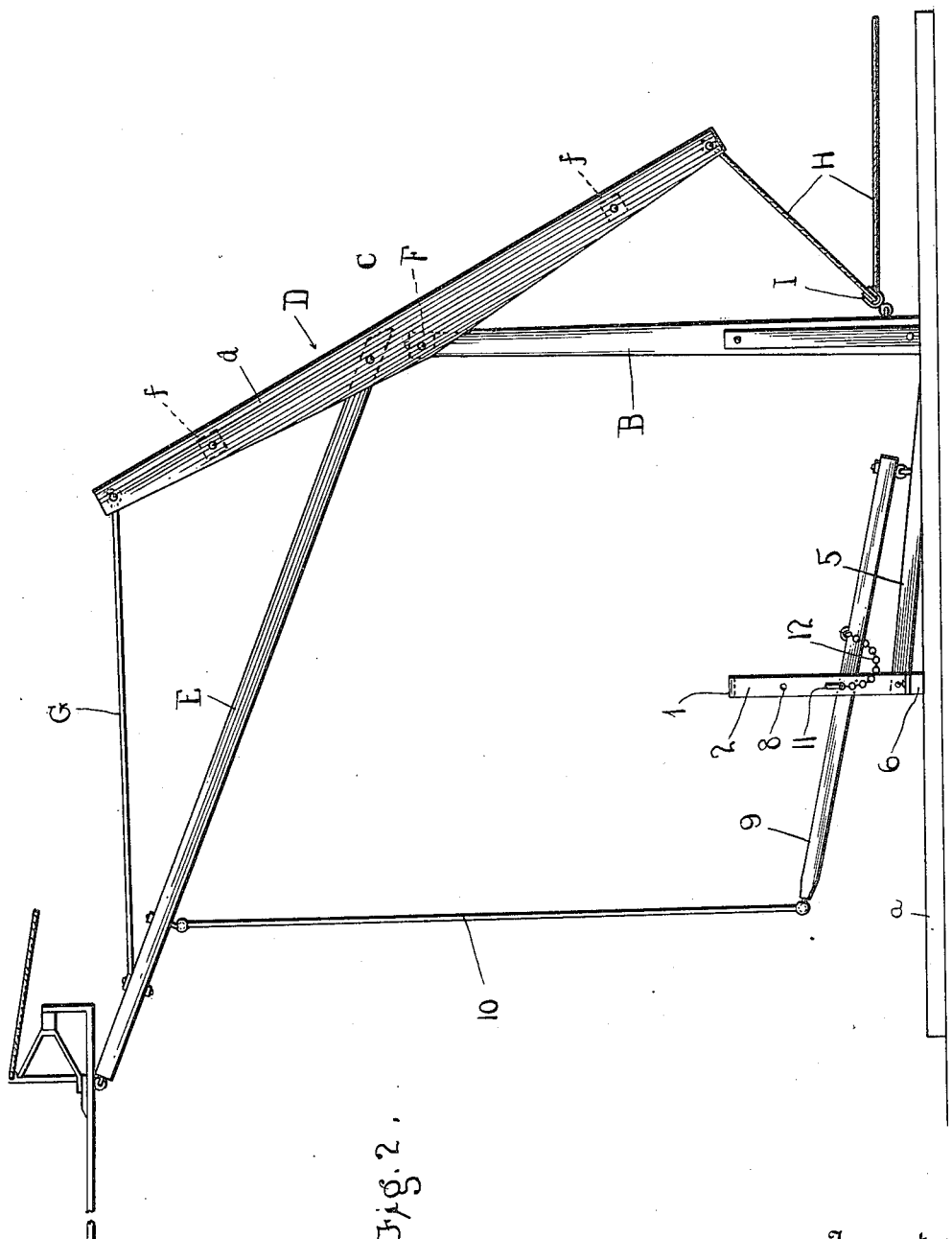

UNITED STATES PATENT OFFICE.

CLIFFORD A. FLEMING, OF HUNTSVILLE, MISSOURI.

RADIUS-JACK.

1,075,639.	Specification of Letters Patent.	Patented Oct. 14, 1913.

Application filed April 3, 1912.   Serial No. 689,281.

*To all whom it may concern:*

Be it known that I, CLIFFORD A. FLEMING, a citizen of the United States, residing at Huntsville, in the county of Randolph and State of Missouri, have invented certain new and useful Improvements in Radius-Jacks; and I do declare the following to be a full, clear, and exact description of the invention, such as will enable others skilled in the art to which it appertains to make and use the same.

This invention relates to a radius jack for use in connection with a swinging arm hay stacker or any other apparatus having a swinging arm.

The object of the invention is to provide a simple and efficient structure which may be sold independently to the trade and applied to any stacker or machine having a swinging arm, and which will relieve the operator of a great amount of hard labor.

With this and other objects in view, the invention consists of certain novel features of construction and the combination and arrangement of parts as will be more fully described and claimed.

In the accompanying drawings: Figure 1 is a plan view of this improved radius jack applied to a swinging arm hay stacker with the arm swung to one side; Fig. 2 is a side elevation with the stacker arm raised to its extreme limit; Fig. 3 is a detail perspective view of the upright guide member of the jack.

In the embodiment illustrated a swinging hay stacker A is shown mounted on a suitable base $a$, and comprising a suitably braced upright B, to the upper end of which is swiveled the lifting beam C of the stacker. This beam is preferably constructed as shown, of two arms or long bars D and E secured together at an obtuse angle, the bar D being preferably composed of two side members $d$ and $e$ spaced apart by blocks $f$ through which connecting screws or other elements are passed for holding said members $d$ and $e$ in fixed relation. The opposite ends of these members $d$ and $e$ preferably converge, being spaced apart the greatest distance at their center or midway their ends, said central portion being adapted to span the upper end of the upright B, being here shown pivotally mounted on a block F which is swiveled to the upper end of said upright B and permits the beam to swing laterally on said upright and to move vertically relatively thereto. The bar E has one end inserted between the members $d$ and $e$ of the bar D, preferably near its pivotal connection with the upright B and is fixed thereto in any suitable manner. A brace G is connected at one end to the front end of the bar D and at its other end to the front end of the bar E, whereby said bars D and E are held rigidly in relation to each other. A rope or other flexible element H is connected at one end to the rear end of the bar D and passes under a pulley I loosely connected with the upright B, preferably near its base, said rope being operable for raising the lifting beam when desired.

The parts above described may be of any suitable or desired construction constituting a swinging arm hay stacker such as is ordinarily used.

The radius jack which constitutes this invention comprises an upright member 1 composed of two laterally spaced bars 2 and 3, preferably connected together at their upper ends and provided at their lower ends with out-turned feet for connection with a supporting base, here shown in the form of three bars 5, 6 and 7, which extend laterally or radiate from the member 1 and which are designed to be secured to the base $a$ or any other suitable surface by any suitable means which will rigidly connect them to said surface. The upright 1 is here shown composed of metal, but it may be composed of wood or other suitable material, and the members 2 and 3 thereof are provided with longitudinally spaced registering apertures 8, for a purpose to be described.

A long bar 9 extends between the bars 2 and 3 and is loosely connected at one end to the radiating brace bar 5, said bar 9 having one end shown extended between the bars 2 and 3 and securely fastened thereto. The free end of the bar 9 projects some distance beyond the upright 1, and is swiveled or otherwise loosely connected to one end of a radius rod 10, the free end of which is similarly connected to the free front end of the beam C of the hay stacker.

A pin 11 is adapted to be removably engaged with the registering apertures in the bars 2 and 3 above the bar 9 for limiting its upward movement and thereby controlling the upward movement of the lifting beam C. The pin 11 is preferably connected with the bar 9 by a flexible element 12 which prevents all danger of the pin becoming lost when not in use. The upward movement of the arm 9 is limited by its contact with the pin 11, which may be adjusted vertically in the registering apertures of the bars 2 and 3, which enables the machine to be set and adjusted from time to time so that the fork or other implement which is connected with the front end of the beam C will deliver the hay at various heights above the ground as required. The weight of the fork is transmitted through the radius rod 10 and bar 9 direct to the arm or bar 5 of the jack supporting base so that the upright B of the stacker is relieved of strain. After the hay is placed on the fork the rope or cord H is pulled down and the lifting beam is turned on its pivot and the fork raised, said beam being partially revolved and slued around until it reaches the position shown in Fig. 1, being guided by the radius rod 10 and bar 9. The beam C at first slues around very slowly in proportion to its upward movement, but slues very quickly as it approaches the full height of its travel, and when the beam is on the center line of the frame its movement stops. The hay is then discharged and on the slackening of the rope H the fork descends in a reverse direction to its original position because it did not arrive at or pass the exact center line of the frame. In practice, the fork carried by the beam works on one side of the center of the frame unless pulled around to arrange it to work on the other side of the frame. The fork carried by the front end of the beam can be slued to one side or the other as preferred, when the height of the delivery is adjusted by changing the position of the pin 11 which controls the upward movement of the radius rod supporting bar 9. It will thus be obvious that this improved radius jack may be applied to any stacker already constructed, and that one man to drive the horse is all the labor required to operate it.

I claim as my invention:

1. A radius jack comprising a supporting base, laterally spaced uprights, a bar mounted to move vertically between said uprights, means for limiting the upward movement of said bar, and a radius rod swiveled on one end of said bar and adapted to be connected at its other end with the swinging arm of a hoisting machine.

2. A radius jack comprising laterally spaced uprights connected at their upper ends and provided with registering pairs of longitudinally spaced apertures, laterally extending bars connected with the lower ends of said uprights for securing them rigidly to a supporting surface, a bar loosely connected at one end to one of said laterally extending bars and extending between said spaced uprights with its front end projecting beyond said uprights, adjustable means for regulating the upward movement of said bar, and a radius rod swiveled at one end of the free end of said last mentioned bar and adapted to be connected at its other end with the swinging arm of a hoisting apparatus.

In testimony whereof I have hereunto set my hand in presence of two subscribing witnesses.

CLIFFORD A. FLEMING.

Witnesses:
JIM L. HAMMETT,
W. L. DAMERON.

---

Copies of this patent may be obtained for five cents each, by addressing the "Commissioner of Patents, Washington, D. C."